May 1, 1956  B. H. MATTESON  2,744,220
ELECTRICAL CAPACITOR
Filed June 30, 1952

INVENTOR
BENJAMIN H. MATTESON

BY
ATTORNEYS

United States Patent Office 2,744,220
Patented May 1, 1956

2,744,220

ELECTRICAL CAPACITOR

Benjamin H. Matteson, Corona, Calif., assignor to the United States of America as represented by the Secretary of the Navy Application June 30, 1952, Serial No. 296,530

1 Claim. (Cl. 317—249)

(Granted under Title 35, U. S. Code (1952), sec. 266)

The invention described herein may be manufactured and used by or for the Government of the United States of America for governmental purposes without the payment of any royalties thereon or therefor.

This invention relates to an electrical capacitor and more particularly to a single variable capacitor having two means for independently varying its value.

From elementary studies of capacitors, it is well-known that the value of a capacitor varies in direct proportion to the area of the plates and varies in inverse proportion with the distance between the plates. Considering the nature of the latter variation with distance, it may be observed that as the distance between plates becomes infinitely small, the capacitor value approaches infinity, while conversely as the distance between plates becomes larger and larger, the capacitor value approaches zero. Thus, a variable capacitor constructed to have means for adjusting the distance between plates may theoretically be tuned from zero to infinity, or over an infinite range. If a second adjustment means should be provided for such a variable capacitor enabling the area of the plates to be independently varied from approximately zero to a finite value, a very useful electrical tool is evolved, for the capacitance value is thereafter a function of two independent variables enabling its use as a computer for adding, subtracting, and multiplying, as a modulator responsive to two independent signals, or for any application requiring the electrical combination of two independent variables whether simultaneously or sequentially applied.

Difficulties are generally encountered in devising such a capacitor for should a variation of the distance between capacitor surfaces in addition change the effective area of the surfaces, the range of adjustment of the second variable, or change of capacitor value with area becomes limited. Similarly, should a variation of the surface areas result in a change of distance between the surfaces, the range of adjustment of the first variable, or change of capacitor value with distance becomes limited.

To correct for these difficulties, the present invention provides a variable capacitor having a first means for varying the distance between the capacitor surfaces, and a second means for varying the area of the surfaces in capacitive engagement whereby the capacitor value is substantially a true function of two independent variables. In addition, due to the novel construction of this capacitor, each of the above means for varying its value is substantially independent of the other, that is variation of the distance between the capacitor surfaces has substantially no effect upon the area of the surfaces in capacitive engagement, while similarly variation of the area has substantially no effect upon the distance.

It is accordingly one object of this invention to provide a single capacitor having two independent means for varying its value.

A further object of this invention is to provide a single variable capacitor whose value is a function of two independent variables.

A further object of this invention is to provide a single capacitor having a first means for rapidly varying its value over a wide range, and a second means for varying its value from approximately zero to the value selected by the first means.

Other objects and many of the attendant advantages of this invention will be readily appreciated as the same becomes better understood by reference to the following detailed description when considered in connection with the accompanying drawings wherein.

Figure 1:
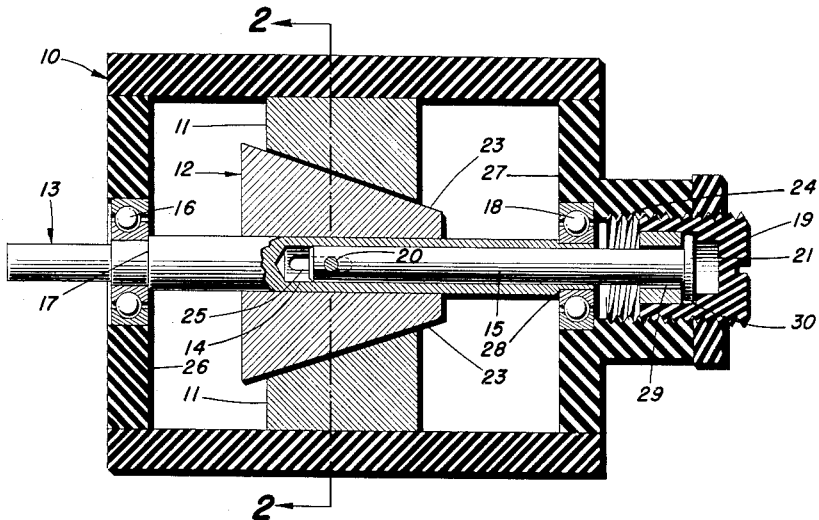
Fig. 1 is a longitudinal cross section through a preferred type variable capacitor constructed in accordance with the present invention.
Figure 2:
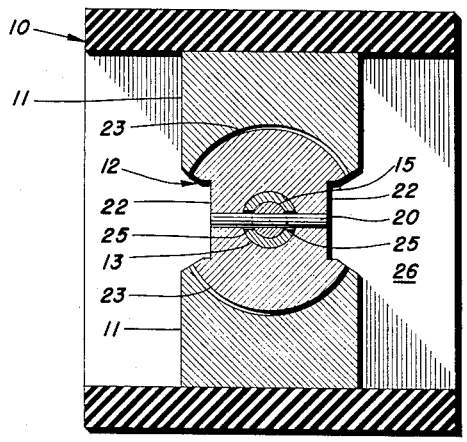
Fig. 2 is a sectional view through line 2—2 of Fig. 1.

Referring now in detail to the drawings for one preferred embodiment of the invention, Fig. 1 shows in side cross section a box-shaped housing 10 of insulating material supporting two oppositely disposed and spaced capacitor stator poles 11 of conducting material from the underside of its top and bottom. Stator poles 11 are preferably provided with opposed concave sloping surfaces of like area and configuration which are substantially complementary to and adapted to overlie and underlie surface portions of a rotor 12, comprising in the preferred embodiment as shown by the two cross sectional views of Figs. 1 and 2, a truncated conical member having opposite sides cut away at 22 to provide two opposed convex conical surface segments 23. Rotor 12 is supported to rotate within the space between poles 11 and at equal distances therefrom by a shaft 13 which is rotatably mounted in housing 10 by ball bearings 16 and 18 or other type rotatable mounts. Shaft 13, as may be observed from Fig. 2, axially penetrates the central portion of rotor 12 and may be splined to rotate rotor 12, or, as shown, is coaxially connected thereto by a pin 20 penetrating rotor 12 and passing through a slot 25 in shaft 13. Within a hollowed out portion 14 of shaft 13 is concentrically positioned a second shaft 15 which is positively connecter to rotor 12 by the aforementioned pin 20. Elongated slot 25 extending through a portion of outer shaft 13 enables pin 20 to be moved backward and forward in a direction longitudinal to shaft 13, and as rotor 12 and inner shaft 15 are positively connected to pin 20, they too are slidably fastened to shaft 13 for longitudinal movement. Shoulders 17 and 28 of shaft 13 contact opposite sides 26 and 27 of the housing preventing shaft 13 from longitudinal movement, however as the only positive connection to inner shaft 15 is the pin 20 connecting it to rotor 12, inner shaft 15 may rotate with rotor 12 and also longitudinally slide within space 14 of outer shaft 13. Inner shaft 15 further extends beyond the end of outer shaft 13 into opening 29 of a threaded plug 19 which engages complementary threads 24 of an extended portion of housing 10. Plug opening 29 has an enlarged portion 30 to receive a flanged head 21 of inner shaft 15, and upon threading of plug 19 into or out of housing 10, inner shaft 15 is urged axially inwardly and outwardly by the plug shoulders contacting opposite sides of the inner shaft flange portion 21.

Figure 3:
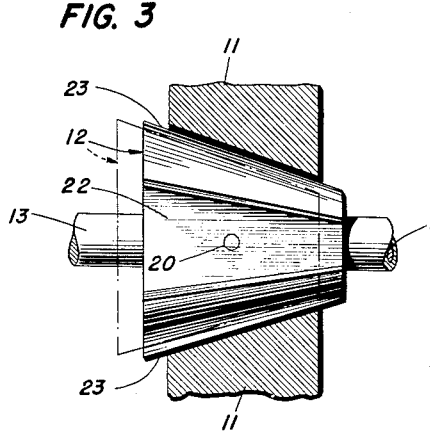
Fig. 3 is an enlarged side view, partly in section, of the preferred capacitor stator and two positions of the capacitor rotor.

Considering now the operation of this device as a variable-capacitor, the concentric conically shaped surfaces 23 of the rotor 12 form with the complementary stator pole surfaces two series connected, air dielectric capacitors having the rotor as a common variable member. Longitudinal movement of the rotor into or out of the space between the opposed poles, as may clearly be observed from Fig. 3, varies the distance between the capacitors' surfaces. However, as the rotor conical surfaces normally extend beyond the stator pole faces, longitudinal movement of the rotor does not vary the effective area of the rotor surfaces in capacitive engagement with the stator pole surfaces but only varies the distance therebetween. Rotation of rotor member 12, as may be observed from Fig. 2 varies the effective area of the rotor in capacitive engagement with the stator, and as the cut away surface portions 22 of the rotor are relatively far removed from the stator pole faces, this rotation has little effect upon the distance between the capacitor rotor and stator surfaces. Longitudinal positioning of the rotor is accomplished by threading plug 19 further into or out of the housing to thereby urge inner shaft 15 axially inwardly or outwardly as desired enabling axial movement of inner shaft 15 within space 14 of shaft 13 to position rotor 12 as desired. Rotation of rotor 12 is accomplished by rotatably adjusting the extending portion of shaft 13.

Thus it may now be observed that the capacitor surfaces may be displaced toward and away from each other to vary the capacitor value over a very wide range, while either simultaneously or sequentially the surface areas of the capacitor may be continuously adjusted to vary the capacitor value over the range of approximately zero to the value determined by the spacing adjustment.

Obviously many modifications and variations of the present invention are possible in the light of the above teachings. It is therefore to be understood that within the scope of the appended claim the invention may be practiced otherwise than as specifically described.

What is claimed is:

A variable capacitor comprising a box-shaped housing composed of electrically insulating material, oppositely disposed and spaced stator poles of conducting material fastened to the underside of the top and bottom of the housing, said stator poles being provided with opposed concave sloping surfaces of like area and configuration, a rotor of a truncated conical configuration having opposite sides cut away to provide opposed convex conical segments complementary to and adapted to overlie and underlie the sloping surfaces of the stator poles, the axial length of the rotor being greater than the axial length of the poles, a rotor shaft penetrating the central portion of the rotor for rotatably supporting the rotor within the space between the stator poles and at equal distances therefrom, said shaft having a portion thereof made hollow and being provided with slots extending therethrough, the shaft being rotatably mounted in the housing by rotatable mount means positioned in a pair of opposite walls of the housing, a coaxial shaft slidably mounted within the hollowed portion of the rotor shaft, connecting means passing through the axial slots of the rotor shaft and positively engaged to the rotor and the coaxial shaft for axial adjustment of the rotor on the rotor shaft, said coaxial shaft being of a length to extend in an axial direction beyond the end of the rotor shaft, and an electrically insulated adjusting means connected to the end of the coaxial shaft such that axial adjustment of the rotor may be achieved by singular movement of the adjusting means in order to vary the distance between the rotor and the poles.

References Cited in the file of this patent

UNITED STATES PATENTS

| 1,733,711 | Zwicker | Oct. 29, 1929 |
| 1,735,889 | Blough | Nov. 19, 1929 |
| 2,556,453 | Sperry | June 12, 1951 |
| 2,659,039 | Bourgonnier et al. | Nov. 10, 1953 |

FOREIGN PATENTS

| 652,305 | France | Oct. 22, 1928 |
| 670,916 | France | Oct. 26, 1929 |